United States Patent [19]
Dembo

[11] Patent Number: 5,799,287
[45] Date of Patent: Aug. 25, 1998

[54] METHOD AND APPARATUS FOR OPTIMAL PORTFOLIO REPLICATION

[76] Inventor: Ron S. Dembo, 822 Richmond St. W., Toronto, Ontario, Canada, MCJ 1C9

[21] Appl. No.: 866,303

[22] Filed: May 30, 1997

Related U.S. Application Data

[63] Continuation of Ser. No. 248,042, May 24, 1994, abandoned.

[51] Int. Cl.$^6$ .................................................. G06F 157/00
[52] U.S. Cl. .................................................. 705/36
[58] Field of Search ..................... 705/36, 37, 35; 395/925

[56] References Cited

U.S. PATENT DOCUMENTS

| | | | |
|---|---|---|---|
| 4,346,442 | 8/1982 | Musmanno | 364/408 |
| 4,642,768 | 2/1987 | Roberts | 364/408 |
| 4,674,044 | 6/1987 | Kalmus et al. | 364/408 |
| 4,694,397 | 9/1987 | Grant et al. | 364/408 |
| 4,722,055 | 1/1988 | Roberts | 364/408 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,752,877 | 6/1988 | Roberts et al. | 364/408 |
| 4,797,839 | 1/1989 | Powell | 364/554 |
| 4,953,085 | 8/1990 | Atkins | 364/408 |
| 5,101,353 | 3/1992 | Lupien et al. | 705/37 |
| 5,148,365 | 9/1992 | Dembo | 364/402 |

OTHER PUBLICATIONS

Goddard, Claire, Measuring Treasury Performance, Mortgate Finance Gazette, May 6, 1992, pp. 1–2.

World: Forex–A World of Options, Euromoney Supplements, Nov. 17, 1989, p. 3.

Stein, Jon, Where Corporate Treasurers Can Look for Help, Futures, Oct. 1989.

"Derosa ARBS Japanese Warrants Against Nikkei Options", Derivatives Week, May 4, 1992, vol. I, No. 5, p. 2.

Wiest, "Portfolio Gains Favor in FX Mangement", Reuter's BC Cycle, Apr. 6, 1992.

Elgin, "Portfolio Hedging Emerges in New Forms to Shield Investments: Investments and Benefits", Corporate Cashflow Magazine, vol. 11, p. 22.

Hansell, "Is the World Ready for Synthetic Equity", Institutional Investor, Aug. 1990, p. 54.

Voorkees, "Can Portfolio Insurance Make a Comeback", Institutional Investor, Jan. 1988, p. 57.

Ring, "Wells Fargo Gets Most New Business in Dynamic Wedging", Pensions & Investment Age, Feb. 9, 1987, p. 31.

Dembo et al., "Tracking Models and the Optimal Regret Distribution in Asset Allocation", Applied Stochastic Models and Data Analysis, 1990, vol. 8, pp. 151–157.

Dembo, "Scenario Optimization", Annals of Operation Research, 30 (1991) pp. 63–80.

(List continued on next page.)

Primary Examiner—Donald E. McElheny, Jr.
Attorney, Agent, or Firm—Kenyon & Kenyon

[57] ABSTRACT

A method and apparatus for determining an optimal replicating portfolio for a given target portfolio involves an initial step wherein a user defines a target portfolio to be replicated, a set of available market instruments from which the replicating portfolio may be created, a set of future scenarios, a horizon date, and a minimum profit to be attained. A representation of the trade-off between risk and expected profit for some arbitrary replicating portfolio is then determined and used to calculate a maximum risk-adjusted profit. The maximum risk-adjusted profit reflects that level of return that may be achieved with an optimum degree of risk; that is, it reflects that point in the risk/reward trade-off where a marginal cost of risk is equivalent to a marginal benefit attainable by assuming that risk. The method then uses the predefined set of available market instruments to identify a set of transactions that will create a replicating portfolio that will achieve the maximum risk-adjusted profit. The method and apparatus also derives the information required to compute a risk premium for pricing of portfolios in incomplete markets, and performs the computation.

12 Claims, 8 Drawing Sheets

OTHER PUBLICATIONS

Torres, "'Synthetic' Stock: Future Stand–In for the Real Thing", *The Wall Street Journal*, Oct. 19, 1990.

Torres, "Mathematician Race to Develop New Kinds of Trading Instruments", *The Wall Street Journal*, Oct. 18, 1991.

Stoffman, "The Hedging Hotshot of Bay street", Dec. 1990, pp. 56–59.

Dembo et al., "French Dressing", *Equity Derivatives*.

Dembo et al., "Protective Basket," *Options*, vol. 3, No. 2, Feb. 1990, pp. 25–28.

Dembo, "The Art of the Optimum", *Risk*, vol. 3, No. 4, Apr. 1990, pp. 17–21.

Dembo et al., "Share the Load", *Risk*, vol. 4, No. 4, Apr. 1991, pp. 44–47.

Davidson, "Drawing on Data", *Technology*, pp. 49–53.

"The Cafe Behind the Hedge", *Open Finance*, Summer 1992.

METHOD AND APPARATUS FOR OPTIMAL PORTFOLIO REPLICATION

This is a continuation of application Ser. No. 08/248,042, filed May 24, 1994, now abandoned.

FIELD OF THE INVENTION

The present invention is directed to a computer-based method and apparatus for replication of a portfolio; and in particular, to a method and apparatus for generating a replicating portfolio with an optimal balance of expected profit and risk.

BACKGROUND OF THE INVENTION

A portfolio manager controls a portfolio (or "book") of equities or other securities that are usually traded on an exchange, such as the New York Stock Exchange. The portfolio manager must continuously adjust the book by making trades aimed at increasing reward (that is, profit) while reducing the risk of loss. In some cases, the portfolio manager may decide to undertake a particular risk where the risk is slight compared to the potential reward. As the portfolio manager makes trades, the risk and potential reward values of the portfolio adjust according to the characteristics of the changing portfolio assets.

One way in which portfolio managers in the investment field attempt to increase portfolio performance and profit while controlling risk or exposure to loss is through portfolio insurance. Various approaches to portfolio insurance are known, such as hedging, dynamic hedging, and option or replication techniques. The principle focus of such techniques is to provide downside protection for any exposure inherent in the portfolio; in other words, portfolio insurance guards against the risk of a dramatic downturn in the value of the portfolio.

A significant disadvantage of present hedging methodologies is their reliance on standard assumptions that are often incorrect. These standard assumptions typically include (a) the price of an underlying asset may be represented by a continuous random variable; (b) there are no transaction costs; (c) the market is liquid, complete and arbitrage-free (that is, instruments are correctly priced); (d) volatility of price movements is fixed or may be represented as a known function of time; and (e) discount rates are fixed or may be represented as a known function of time.

Using assumptions such as these, Black and Scholes developed a dynamic trading strategy designed to perfectly replicate the payoff function of a European option. See F. Black and M. Scholes, *The Pricing of Options and Corporate Liabilities*, Journal of Political Economy, vol. 81, 637–654 (1973). The Black and Scholes replication strategy is the basis for the vast majority of hedging done today. Unfortunately, most markets are not continuous, nor is trading "frictionless" (that is, without transaction costs). Market gaps often occur, for example, as a result of price changes, volatility changes, and interest rate movements. For instance, a market gap would occur if the Federal Reserve were to announce an increase in its prime lending rate while a market affected by that rate, such as the New York Stock Exchange, was closed. In such a case, interest rates were at one value when the market closed, but would be at a second, higher value when the market reopened for the next session. As a result of such gaps, returns on investments are often far from the expected.

Insurance is generally desired over a time frame long enough to match the expected period of portfolio exposure. Ideally, the portfolio manager is able to acquire options which are sufficiently long-dated so as to provide the necessary insurance over the desired time period. Although long-dated options are available in the over-the-counter (OTC) market, the lack of liquidity and standardization for these options makes them more expensive than similar exchange-traded options. However, since exchange-traded options frequently have much shorter maturities than those desired for long-dated options, portfolio managers are nonetheless forced to acquire such options in the OTC market.

Current option or replication techniques enable a portfolio manager to create synthetic long-dated options that satisfy the requirements for portfolio insurance. A desired synthetic option may be created from a combination of various existing cash market instruments, futures contracts, and exchange-traded options. The components of such synthetic long-dated options may be acquired with significantly less cost than equivalent long-dated options available over-the-counter, thus lowering the cost of portfolio insurance. Advantages of such option replication strategies over dynamic hedging strategies include significantly lower management overhead and greater predictability of transaction costs.

In addition to creating synthetic securities which may or may not have an equivalent in the market, a portfolio manager may attempt to construct a portfolio whose value tracks a given market index. For example, a portfolio may be constructed from a set of bonds whose values are intended to offset a set of future liabilities or to hedge against losses in a given portfolio. This technique is referred to as "portfolio replication."

As noted above, dynamic replication based on Black-Scholes theory is the primary means used to hedge options positions in practice today. Black-Scholes dynamic replication is often called "delta hedging." Such hedges, however, generally fail at the very time when hedging is needed most, since the assumptions upon which these hedges are based do not hold true in turbulent markets. Accordingly, a method of portfolio insurance is desired that considers all possible future states of the world. Such a method would thus be able to provide adequate protection in the face of turbulent market conditions.

In pragmatic terms, a portfolio manager controlling a given portfolio (i.e., a target portfolio) has the objective of constructing a replicating portfolio that behaves identically to the target portfolio under all possible future states of the world. Such a replicating portfolio is called a perfect replication. A perfect replication will produce a perfect hedge for the target portfolio; that is, a short position in the replicating portfolio coupled with a long position in the target portfolio will result in no net exposure. In real markets, however, perfect replication may not always be possible.

An approach to portfolio replication is disclosed in R. Dembo, *Scenario Optimization*, Annals of Operations Research, vol. 30, 63–80 (1991) and Dembo and King, *Tracking Models and the Optimal Regret Distribution in Asset Allocation*, Applied Stochastic Models and Data Analysis, vol. 8, 151–157 (1992), both of which are expressly incorporated herein by reference. This technique employs a regret function that measures the expected difference between the value of a given portfolio and an arbitrary target portfolio at maturity. In effect, the regret function measures what one can achieve with a decision today against what one could achieve with perfect foresight. With perfect foresight, all possible scenarios and their corresponding probabilities are known at the start of the period over which a portfolio is to be hedged. According to the regret function, a replicating portfolio with a zero regret value will perfectly match the target portfolio under all possible outcomes. The regret function is also useful for determining the value of residual or known risk in the replicating portfolio. In markets where zero regret is not possible, it is best to obtain a replicating portfolio that comes as close as possible to zero regret. This technique is further described in U.S. Pat. No. 5,148,365 to Dembo, entitled "Scenario Optimization," the disclosure of which is expressly incorporated herein by reference.

A drawback of portfolio replication, even when using the regret function, is that the technique ignores the cost of maintaining the hedge. Under Black-Scholes theory, for example, the cost of a hedge over the life of a deal is set to its fair market price; however, this relies on many assumptions, including the absence of transaction costs. In practice, the assumptions required by Black-Scholes have proven to be far from valid. Indeed, the cost of a given hedge may be significantly higher than what the theory predicts. Delta hedging may thus be extremely costly, even to the point of exhausting all profits from a particular trade. In extreme cases, the cost of a delta hedge may be high enough to erase the entire annual profits of a trading operation. Such situations have arisen often enough to warrant the search for an improved hedging technique.

Known techniques for portfolio replication neither control the cost of a hedge nor provide a mechanism for trading-off the cost of a hedge against the expected quality of protection the hedge offers. For example, a small increase in the cost of a hedge may greatly decrease the risk of loss. Thus, an improved hedging technique must include a determination of the cost of the hedge or replication to enable calculation of an expected risk-adjusted profit from the portfolio or deal that is being hedged or replicated.

An ideal starting point for an improved hedging technique is a known method for optimally allocating available resources in a physical system using a mathematical model having at least one parameter of uncertain value, as disclosed by the above-referenced patent issued to Dembo. Optimization methods of this type determine a single solution to a desired equation which best fits a desired system behavior. While this result is beneficial, often what is desired is not a single best-fit solution, but rather a family of solutions where each solution in the family represents an expected reward for a given degree of risk.

Another desirable feature of an improved hedging technique would be the ability to detect a market instrument whose market value differs from its "true" value. Known systems and models are able to detect mispricing in a market to a limited extent. For example, it is known to determine whether a security is mispriced relative to market conditions. This condition is referred to as "absolute" mispricing. Typically, however, models used for portfolio replication are unable to determine whether a security in a given portfolio is mispriced relative to the portfolio itself, as opposed to market conditions. That is, a portfolio manager may wish to determine whether an instrument is fairly priced relative to the other instruments in a portfolio. This type of mispricing is essentially a subset of absolute mispricing, since any given portfolio is a subset of some market.

Finally, an improved hedging technique should enable a portfolio manager to determine an expected profit relative to the risk associated with attaining that profit. When trading securities, it is of course desirable to maximize profits with respect to each transaction. To this end, current hedging techniques value securities with respect to market value. Nonetheless, because each transaction involves a measurement of risk, it is more desirable to value securities with respect to risk. The improved hedging technique should thus seek to determine profit for a deal by maximizing a risk-adjusted profit.

A method and apparatus for optimal portfolio replication according to the present invention provides a portfolio manager with a hedging tool that incorporates these desired features.

SUMMARY OF THE INVENTION

The present invention provides an improved method and apparatus for portfolio replication which seeks to reach an optimal balance between expected profit and the risk involved in attaining that profit. In one embodiment, the present invention identifies a set of transactions required to achieve an optimal hedge by analyzing the portfolio replication according to a stochastic model which takes into account the trade-off between the cost of the hedge and the quality of protection it offers.

Unlike known delta hedging techniques, the present invention can produce a hedge that provides protection over a range of user-specified scenarios while explicitly accounting for the cost of the hedge. Hedge cost is computed as the expected profit or loss accounting for the buy and sell decisions required to maintain the hedge over its lifetime. Moreover, the present invention can describe the risk involved with the hedge as a function of the size of the profit to be taken out of the position, thus enabling a portfolio manager to selectively determine the optimal trade-off between assumed risk and expected profits.

A hedge is typically designed to provide protection over some predetermined time period. At the beginning of any such period, there is uncertainty about which one of an infinite number of possible future states will actually occur. Given a target return distribution (that is, the profit to be derived from the portfolio), the objective for a portfolio manager is to structure a replicating portfolio that tracks the target return (or any other attribute, such as volatility) under all possible scenarios. The present invention is accordingly directed to producing a hedge having a smallest possible tracking error, or residual risk. Although some degree of residual risk is inherent in the uncertainty of the future state of the world, the present invention does not require arbitrary bounds or improbable assumptions to prescribe a solution. Accordingly, the replicating portfolio will conform to expectations much more closely than is possible using previously known techniques.

The present invention adopts a constructive approach that explicitly specifies the trades that a portfolio manager should undertake to replicate a target portfolio. As discussed above, hedging based on Black-Scholes theory performs poorly in markets exhibiting gaps in the behavior of market variables such as price, interest rates and volatility. A Black-Scholes replicating portfolio thus provides only limited protection that can be extremely costly in volatile markets. Unlike Black-Scholes, the present invention does not assume that markets behave in a continuous fashion. Instead, the portfolio replication approach of the present invention is based on the more realistic view that markets behave in discrete fashion.

In an advantageous variant of the present invention, a state price vector may be used to derive risk-neutral probabilities, and thus a risk-free discount rate, that may be used for risk-neutral valuation of market instruments. This valuation is advantageously free of investor preferences, thereby ensuring a more accurate result. Assuming a set of scenarios and replicating instruments with known correct prices, the state price vector may also be used to detect mispricing in a security or a portfolio in a given market over a given period of time, again permitting a portfolio manager to develop a replicating portfolio with optimum accuracy.

A representative embodiment of the method and apparatus according to the present invention is a computer-based system that generates a replicating portfolio in four steps: information gathering, preprocessing, optimizing, and pricing. In the information gathering step, a user identifies certain sets of instruments and relevant instrument attributes. For example, the user identifies a target instrument or portfolio of instruments that has an expected payoff at a specified rollover date corresponding to a desired profile, a set of instruments that may be used to create a hedge portfolio, a current portfolio (if one is held), and any new securities to be priced. In addition, the user specifies ranges of values for any uncertain parameters (for example, volatility, yields, beta) to be used in calculating the future value of the instruments specified. These ranges of values define the future states with respect to which the hedge, state price vector and risk/reward profile will be created. Finally, the user assigns a weight to each of the values in the ranges to indicate an estimate of the relative probability of a particular future state actually occurring.

In the preprocessing step, the system determines the probability of each future state as a function of the weights specified by the user in the previous step. In addition, the system determines the expected value at the rollover date of the current holdings (if any), the target portfolio and each instrument in the replicating set, for each of the future states. The maximum possible profit that can be extracted over the life of the trade is then determined. Using these values, the system then creates an instance of an optimization model designed to create a hedge portfolio that replicates the target portfolio with minimum tracking error under the specified future states and subject to a minimum profit requirement.

Following the preprocessing step, the system uses an optimization method to solve the optimization model, with the minimum required profit set to the previously-determined maximum possible profit. The result of this optimization is a replicating portfolio and a corresponding minimum regret, or tracking error. The replicating portfolio, minimum regret and minimum profit are then displayed to the user on an appropriate output device. The replicating portfolio describes a set of trades required to create a portfolio having a minimum tracking error for the required minimum profit. In other words, the replicating portfolio instructs the portfolio manager how to create a portfolio that ensures, to the maximum extent possible, that the required minimum profit will be achieved.

According to one embodiment of the present invention, the risk-adjusted profit associated with the replicating portfolio may then be maximized, and the state price vector and risk neutral probabilities determined and saved to a memory and/or displayed on an output device. It is possible that the optimization method may generate a replicating portfolio where the expected profit over the life of the trade does not exceed the minimum required profit. In such a case, the minimum required profit is reduced and the optimization procedure is repeated. Where the expected profit does exceed the minimum required profit, it can be assumed that the minimum regret over all feasible values of minimum profit has been explored.

In the final step according to this embodiment, the state price vector may be used to establish a price for a new security that is consistent with a portfolio of instruments with known prices. This new security may be, for example, a synthetic long-dated option. The appropriate price of the new security is then output to an appropriate device.

The present invention, by using models which assume that a market behaves in discrete fashion, provides a portfolio manager with a set of specific buy/sell recommendations that maximize risk-adjusted profit. The portfolio manager may then execute these recommendations to create the replicating portfolio. In addition, the portfolio manager may obtain a risk/reward profile for a portfolio, a state price vector, a risk-neutral discount rate, and a computed value of risk. The present invention also enables a portfolio manager to determine if the instruments in a portfolio are fairly priced relative to the other instruments in the portfolio. As can be seen, a method and apparatus according to the present invention can generate a risk-reward trade-off for any portfolio, independent of the market.

The utility of the present invention is not limited to managing investment portfolios. Indeed, the techniques of the present invention can easily be adapted for application to any situation involving a risk/reward trade-off. For example, the present invention can be used by a distributor or retailer of goods to determine an optimal shipping strategy, determining the size and timing of shipments depending on anticipated demand. In such an application, the present invention can be used to select shipping schedules and warehouse locations by trading-off the risk of not meeting a demand against the expected profits.

As another example, the present invention can be applied in the production field to select an optimal number of production facilities by trading-off the risk of not meeting a schedule against the cost of production. In yet another application, the present invention can be used to control a reservoir schedule; that is, to determine an optimal release schedule for water in a reservoir by trading-off the risk of not meeting a demand for either water or electricity against the cost of alternative sources of generating electricity. Additionally, the present invention may be used to determine whether hydro-electric power or fuel power should be generated, depending upon an expected likelihood of precipitation. As will be readily apparent to persons skilled in the art, the present invention can be readily applied to find the optimal solution to virtually any real-world problem requiring a trade-off between anticipated risks and desired rewards.

DETAILED DESCRIPTION

Figure 1:
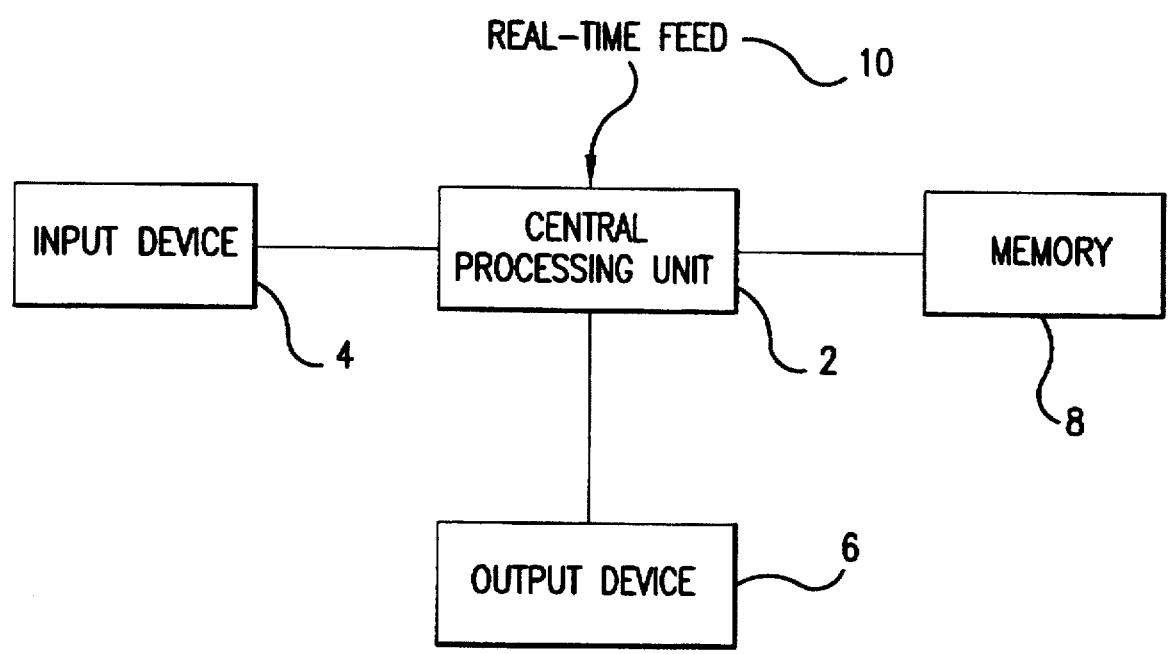
FIG. 1 is a block diagram showing exemplary system hardware for a computer-based embodiment of the present invention.

The present invention is directed to a method and associated apparatus whereby a user may determine an optimal course of action by selecting a suitable balance between a desired reward and the risk required to attain that reward. Referring now to the drawings, FIG. 1 illustrates in block diagram form exemplary system hardware that may be used in a computer-based embodiment of the present invention. A central processing unit (CPU) 2 or other computer-based processor performs logical and analytical calculations. In this embodiment, the CPU 2 operates on a "UNIX" brand or other "POSIX"-compatible platform under "MOTIF/X WINDOWS," and is portable to most workstation environments, including "SUN/OS" and "DEC/ULTRIX" workstations. The CPU 2 is coupled to a memory device 8, such as a high-speed disk drive. An input device 4 is coupled to the CPU 2, enabling a user to enter instructions and other data. The input device 4 may include a keyboard, a mouse or a touch-sensitive display screen. An output device 6, such as a video display monitor, is provided to present textual and graphical information to a system user. The present invention ideally supports real-time data feeds 10 and is capable of executing application programs written in the "C++" programming language using object-oriented programming techniques.

While the present invention is applicable to virtually any real-world situation requiring a trade-off between reward and risk, for purposes of illustration the invention will be described in the context of an embodiment providing a computer-based system for use by an investment portfolio manager in creating a hedge against potential losses. In this context, a portfolio manager may use the system to create a replicating portfolio to serve as a hedge for a given target portfolio. The portfolio manager uses the input device 4 to enter information relating to the target portfolio, any current holdings available for use in generating a replicating portfolio, and the time period for which a hedge is desired. Additional information may be provided through the real-time data feed 10, and may consist of an interface to a real-time stock information service such as that provided by "REUTERS, LTD."

The input information is then supplied to an application program running on the CPU 2, and may also be stored in memory 8. The application program includes software modules capable of processing the input information to ultimately generate a set of buy/sell recommendations which the portfolio manager may execute to optimally insure the target portfolio against significant losses. These trading recommendations are based on decisions made by the portfolio manager relating to the optimal balance of anticipated reward and risk. Information may be presented to the portfolio manager on the output device 4 in the form of graphs, textual displays and printed reports.

Figure 2:
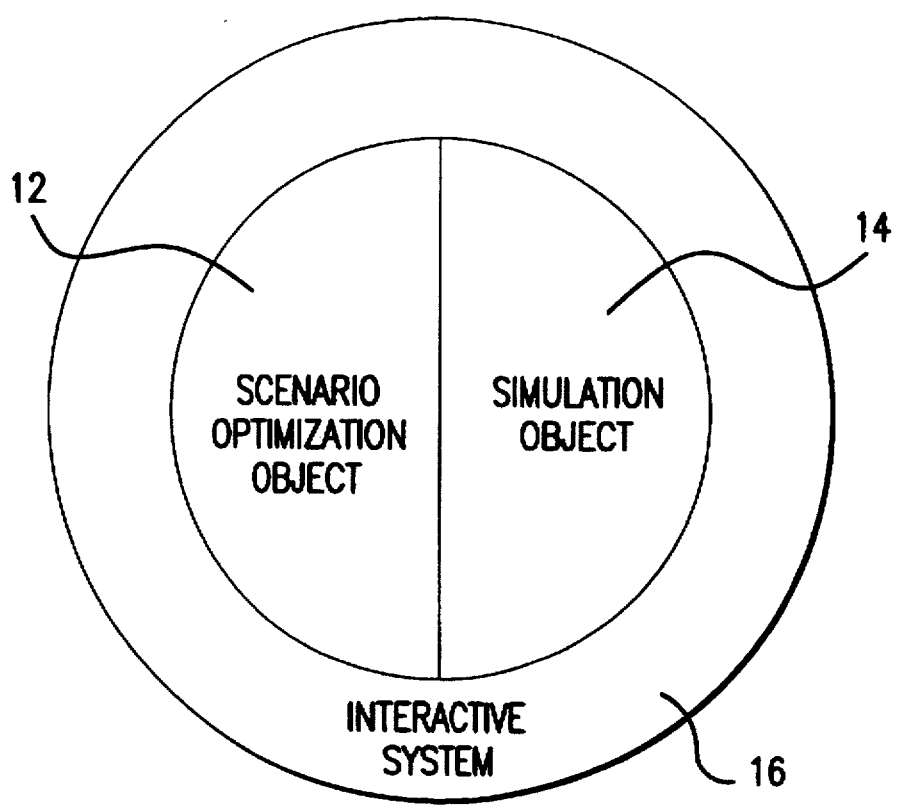
FIG. 2 is a graphical illustration of the high-level programming objects of a computer-based embodiment of the present invention.

Referring to FIG. 2, in terms of object-oriented programming an interactive system 16 providing the application functions of the representative embodiment includes a scenario optimization object 12 and a simulation object 14. The scenario optimization object 12 may receive input relating to current, replicating and target portfolios, future scenarios and user-specified weight values, prices of instruments, and values for attributes such as price sensitivity, time sensitivity and yield sensitivity. Using this input, the scenario optimization object 12 determines a set of reasonable scenarios and their probabilities. Alternatively, the scenario optimization object 12 may accept a user-defined set of scenarios and probabilities. The simulation object 14 permits a portfolio manager to perform "what-if" analyses for given prices, attribute values and scenario probabilities. The scenario optimization object 12 can be used separately or in conjunction with the simulation object 14.

In the embodiment of FIG. 2, the scenario optimization object 12 and the simulation object 14 are embedded in an interactive system 16. The interactive system 16 provides a front-end for users, and can be tailored for particular applications, such as determining optimal hedges using multi-scenario optimization of hedging positions. The interactive system 16 preferably includes a data management component and a graphical user interface. In other embodiments, either or both of the scenario optimization object 12 or simulation object 14 can be embedded in other interactive systems 16 for performing other functions.

An optimal portfolio replication system configured according to the present invention can provide a portfolio manager with the following useful information:

(a) a set of buy/sell recommendations that maximize risk-adjusted profit;

(b) a risk/reward profile;

(c) a state price vector;

(d) a risk-neutral discount rate; and (e) a computed value of risk.

Each of these outputs are explained below; however, a complete understanding of the present invention is aided by an examination of the underlying theoretical principles. These principles are discussed with reference to an exemplary stochastic problem.

Assume that a market includes a finite number N of available instruments, each of which can only be traded in finite amounts without affecting their price. In other words, the market exhibits finite liquidity. Further assume that a hedge is desired for a single time period, and that there are a known, finite number of possible scenarios S that may occur over this period. Only one of these scenarios will have occurred at the end of the period; however, exactly which scenario will occur is unknown at the start of the period.

Each agent i in this market is characterized by individual preferences, which may be represented by a probability vector $p^i$ in a matrix $R^S$ whose components are the subjective probabilities of a future state occurring. Given any target portfolio in this exemplary market, the objective of a portfolio manager desiring a hedge is to find a replicating portfolio that behaves identically to the target portfolio for all possible future states; in other words, a perfect replication.

To create a satisfactory replicating portfolio, let the set $(q_1, q_2, \ldots, q_N)$ represent the known price of these replicating instruments at the start of the hedge period. Additionally, let the set $(d_{1j}, d_{2j}, \ldots, d_{nj})$ represent the value of these replicating instruments at the end of the hedge period if scenario j were to occur (where j=1, 2, ..., S). This set of scenarios, representing various combinations of values for different market factors, represents all of the uncertain events one would need to know in order to determine the state of the market at some point in the future. Techniques for determining such a set of scenarios are well known in the art, and thus are not explained in detail herein.

The notation $d_j$ denotes the N-dimensional column vector with entries $(d_{1j}, d_{2j}, \ldots, d_{nj})$. The N by S dimensional matrix D has as its columns the vectors $d_j$ (where j=1, 2, ..., S). Similarly, the notation q denotes the N-dimensional column vector with entries $(q_1, q_2, \ldots, q_N)$. In this model, the replicating portfolio is represented by a column vector x.

For purposes of this illustration, assume the target portfolio was bought at the beginning of the hedge period for a total cost c, and is subsequently sold at the end of the hedge period for a total price $t_s$, where the vector t corresponds to the total sale price depending on which scenario actually occurs. As above, t denotes a column vector with entries $(t_1, t_2, \ldots, t_S)$.

According to the relationship represented by the above matrix, a perfect replication results from a portfolio that satisfies the equation:

$$\Sigma_j d_{ij} x_j = t_i; (i=1, \ldots S) \quad \text{(EQ 1)}$$

or, in matrix form:

$$D^T x = t \quad \text{(EQ 2)},$$

where the superscript T denotes the transpose of the matrix D. Here, $D^T x$ represents the value of a replicating portfolio under each of the predefined future scenarios, while t represents the value of a target portfolio under all of these scenarios.

A so-called complete market is one in which there always exists a portfolio x that perfectly replicates an arbitrary target portfolio; that is, there always exists an x satisfying equation (2) for an arbitrary t. A complete market arises when the market is sufficiently rich so that there are always more "independent" instruments than scenarios. Two given instruments are independent if their prices are not merely a simple multiple of one another. In other words, independent instruments exhibit different behavior (i.e., values) under different scenarios. Unfortunately, real markets are incomplete.

The above formulation does not determine if or when a perfect replicating portfolio exists in a given market. If a perfect replication does not exist, a portfolio manager will wish to create a "best," albeit imperfect, replication. Here, "best" refers to a smallest possible error in terms of some mathematical norm.

To this end, let E(.) denote an expectation operator. According to the teachings of the Dembo article and the Dembo and King article cited above, a regret function R is defined as:

$$R = E(\|D^T x - t\|) \quad \text{(EQ 3)}.$$

Thus, the regret function measures the expected difference between the value of a given portfolio x and the target portfolio at some horizon time in the future. In other words, R represents a comparison between what one can achieve with a given decision today and what one could achieve with perfect foresight, since with perfect foresight all possible scenarios and their corresponding probability distributions would be known at the start of the hedge period. A replication portfolio with zero regret will perfectly match the target portfolio under all possible outcomes. Another interpretation of regret is the value of residual or known risk in the replicating portfolio.

A related function, termed downside regret DR, is defined as:

$$DR = E(\|(D^T x - t)\_\|) \quad \text{(EQ 4)}.$$

This function represents a form of regret in which only negative deviations from the target are considered. In practice, downside regret may be more useful to a portfolio manager since positive deviations from a target portfolio are generally considered desirable.

As noted above, in a complete market it is always possible to identify a replicating portfolio x such that regret R is zero for a given target portfolio and distribution of scenarios. Further, where zero regret is not achievable, it is desirable to obtain a replicating portfolio that is as close as possible to zero regret. Accordingly, a function termed minimum regret MR may be defined as:

$$MR = \text{Minimize}_x \ldots E(\|D^T x - t\|) \quad \text{(EQ 5)}.$$

Complete markets are therefore characterized by MR=0 for all t, while incomplete markets have MR≧0.

According to these relationships, it is possible to determine a minimum regret portfolio x*, being the portfolio with the smallest possible residual risk that can be obtained without perfect foresight. In terms of the regret function, x* is the optimal replicating portfolio that minimizes residual risk. Thus, a long position in the target portfolio and a short position in x* (or vice versa) is the best available hedge in the face of uncertainty.

The foregoing model, while theoretically useful, is nonetheless deficient. Like known techniques based on the Black-Scholes theory, the model has not taken into account the cost of the hedge itself. The trade-off between the cost of a hedge and the quality of protection it offers, however, is the very essence of a sound hedging methodology. A principle benefit of the present invention, representing a significant advance over the art, is that it enables a portfolio manager to accurately analyze this trade-off in making hedging decisions.

The cost of a hedge can be determined in a number of ways. For example, the cost of a hedge can be computed as the initial cost of purchasing the replicating portfolio, denoted $q^T x$. This, however, does not account for the value of the portfolio at the horizon (that is, at the end of the hedge period). The measure used by the present invention is based on the expected profit or loss over the life of the hedge, which may be computed as follows.

Consider, for example, an issuer (such as a bank that wants to issue an index-linked note) who sells a target instrument short at the start of a hedge period and covers the position with a multi-scenario hedge obtained by replication. The position can then be closed out at the end of the period. The accounting for this transaction would be:

Start of period:

income c from selling the target instrument less cost $q^T x$ of purchasing the replicating portfolio End of period:

expected payoff $E(D^T x)$ from selling the replicating portfolio less expected cost E(t) of repurchasing the target to close-out the deal.

Thus, the present-day value of the expected profit from the deal is:

$$r^{-1} E(D^T x - t) + (c - q^T x) \quad \text{(EQ 6)},$$

where 1+r is the interest rate over the hedge period.

According to the present invention, a parametric optimization function that describes the risk/reward trade-off can be described as follows:

$$MR(K) = \text{Minimize}_x \ldots r^{-1} E(\|D^T x - t\|) \quad \text{(EQ 7)}$$

$$\text{subject to: } r^{-1} E(D^T x - t) + (c - q^T x) \geq K \quad \text{(EQ 8)}.$$

Inequality (8) states that the deal should be expected to make at least K dollars. The parameter K, the expected profit, may be positive or negative. Since MR(K) is an implicit function which is monotonic non-increasing in K, the higher the profit to be taken from the deal, the higher the residual risk (minimum regret). In short, MR(K) is the minimum cost of risk associated with a deal that will yield a desired profit K. As the risk changes, so too does the expected profit.

Unlike known methods of portfolio replication, the present invention enables a portfolio manager to choose an optimal expected profit K based on the level of risk the portfolio manager deems acceptable. This optimal value of K may be determined as follows. To make an expected profit of K, an issuer must expend a cost of risk equal to MR(K). Thus, the risk-adjusted profit for the deal is:

$$K-MR(K) \tag{EQ 9}$$

To maximize this risk-adjusted profit, the system according to the present invention solves the equation:

$$\text{Maximize}_K \ldots K-MR(K) \tag{EQ 10}$$

The solution to this problem may be represented as $K^*$, which occurs at $\lambda=1$, where $\lambda$ represents a marginal cost of risk that is exactly equal to a marginal benefit from assuming that risk. This condition is represented graphically in FIGS. 3-6.

Figure 3:
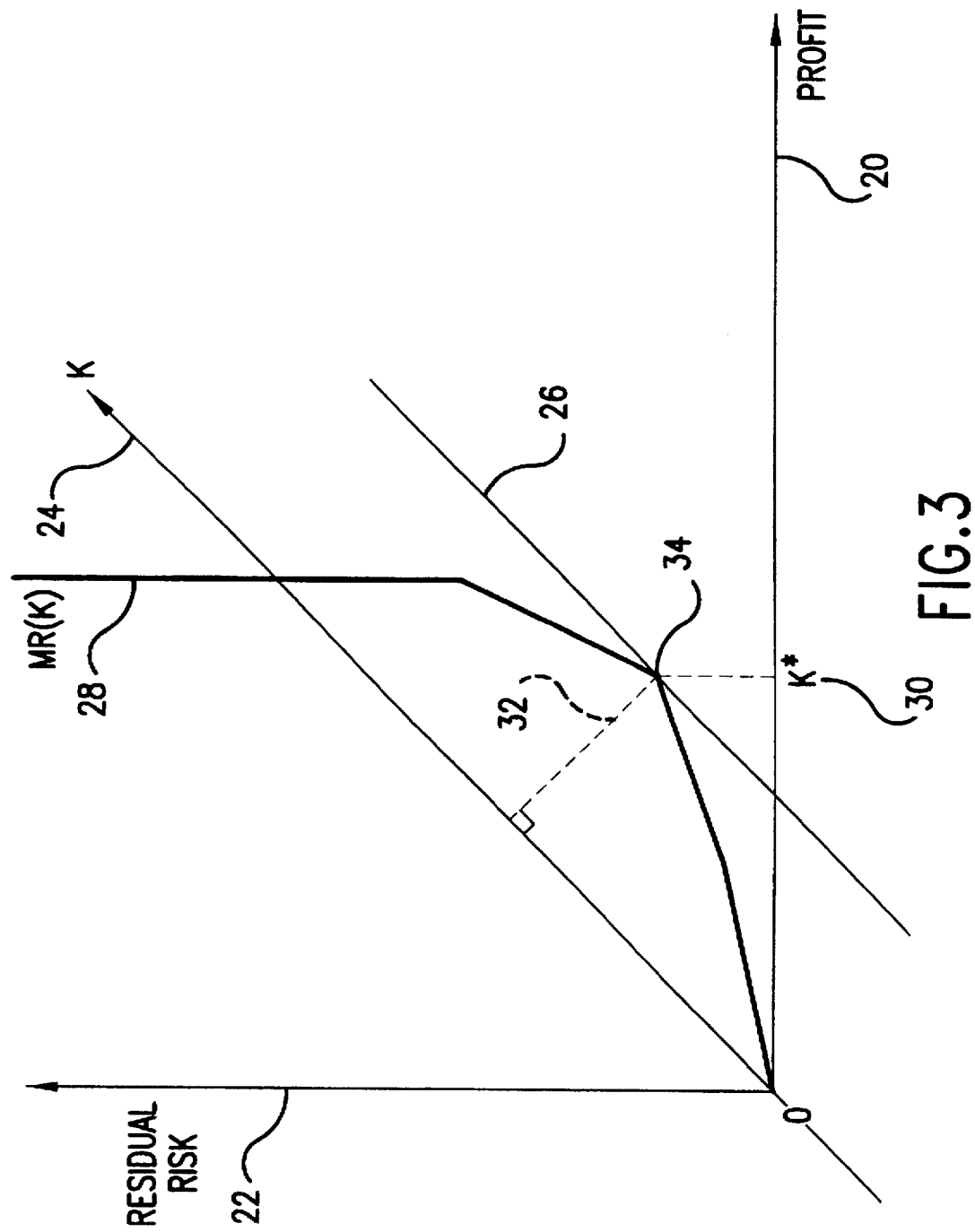
FIGS. 3–6 are graphs representing maximum risk-adjusted profit in various market situations.

FIG. 3 shows a graph that may be used to determine a maximum risk-adjusted profit for a given market. The horizontal axis 20 represents expected profit, while the vertical axis 22 represents residual risk (measured as minimum regret). This particular graph illustrates a complete market with no arbitrage; that is, perfect replication is possible. The line 24 of the function K represents expected profit (in dollars). As can be seen, it is necessary to assume some degree of risk to attain an expected profit greater than zero. Line 28 represents the cost of the risk MR(K) for this market situation, which is calculated according to equation (5) above. As shown, the cost of the risk MR(K) is greater than zero for all expected profits K greater than zero. A portfolio manager will wish to determine the maximum risk-adjusted profit that can be made in this market situation. The maximum risk-adjusted profit will occur at the point where the difference between the expected profit K and the cost of the risk MR(K) is greatest. Graphically, this occurs where a perpendicular 32 drawn from line K to line MR(K) is longest. Here, point 34 represents the maximum risk-adjusted profit.

The portfolio manager will also be interested in the cost of a replicating portfolio that will achieve this maximum risk-adjusted profit. Here, the tangent to the curve MR(K) at $K^*$ (30) represents the shadow price of the expected profit constraint (8) and has a slope of 1. Since FIG. 3 shows a complete market with no arbitrage, the cost c of a perfect replicating portfolio $x^*$ (that is, the minimum regret portfolio) may be represented by $c=q^T x^*$.

Those skilled in the art will readily recognize the practical value of the present invention. A portfolio manager can use such information to determine the desirability of assuming additional risk beyond that associated with the maximum risk-adjusted profit. In the market of FIG. 3, for example, the portfolio manager will see that risk rises dramatically in relation to any additional profit that may be attained.

Figure 4:
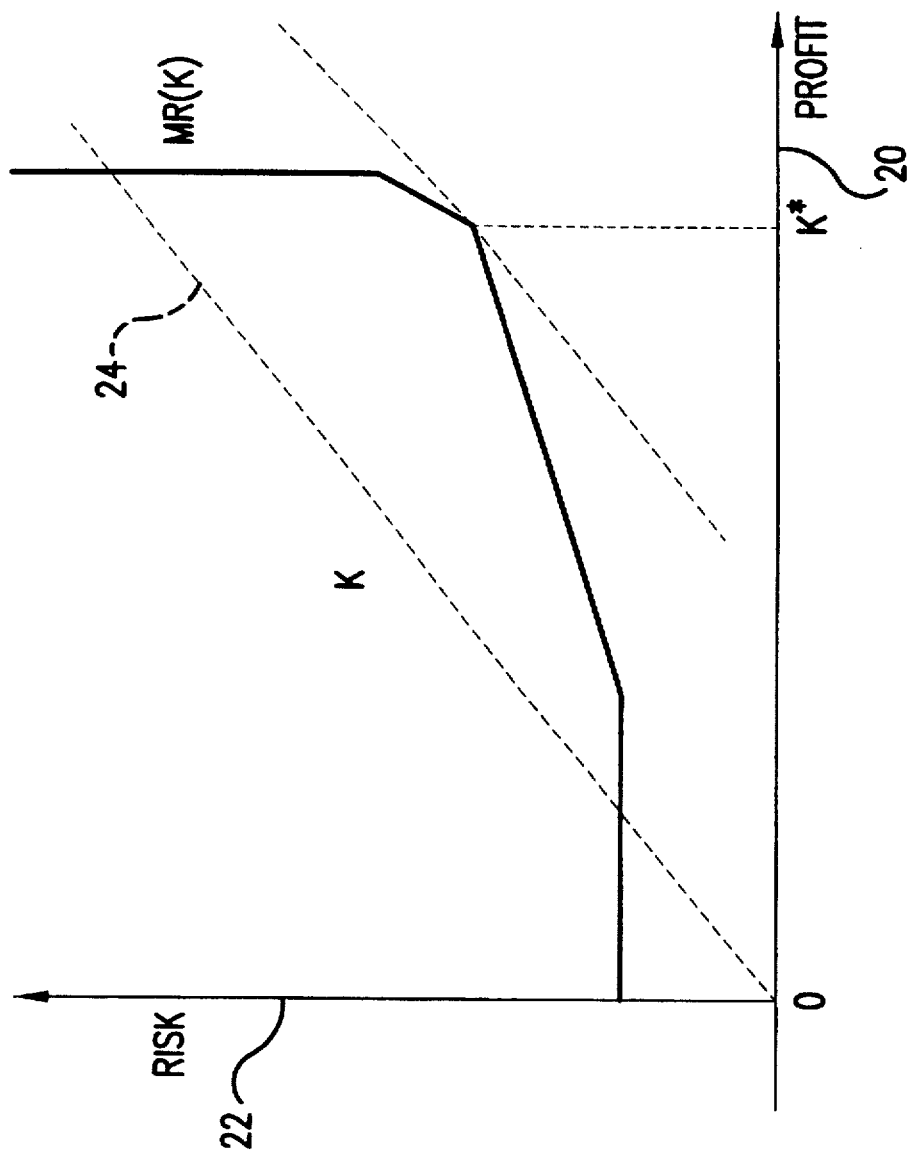

The graph of FIG. 4 represents the risk-reward trade-off in an incomplete market in which there is no arbitrage. As shown, perfect replication is not possible. Here, the risk-adjusted profit MR(K) for a zero profit (K=0) is greater than zero. Thus, there is some risk involved with obtaining even a zero profit (that is, there is always a risk of loss).

Figure 5:
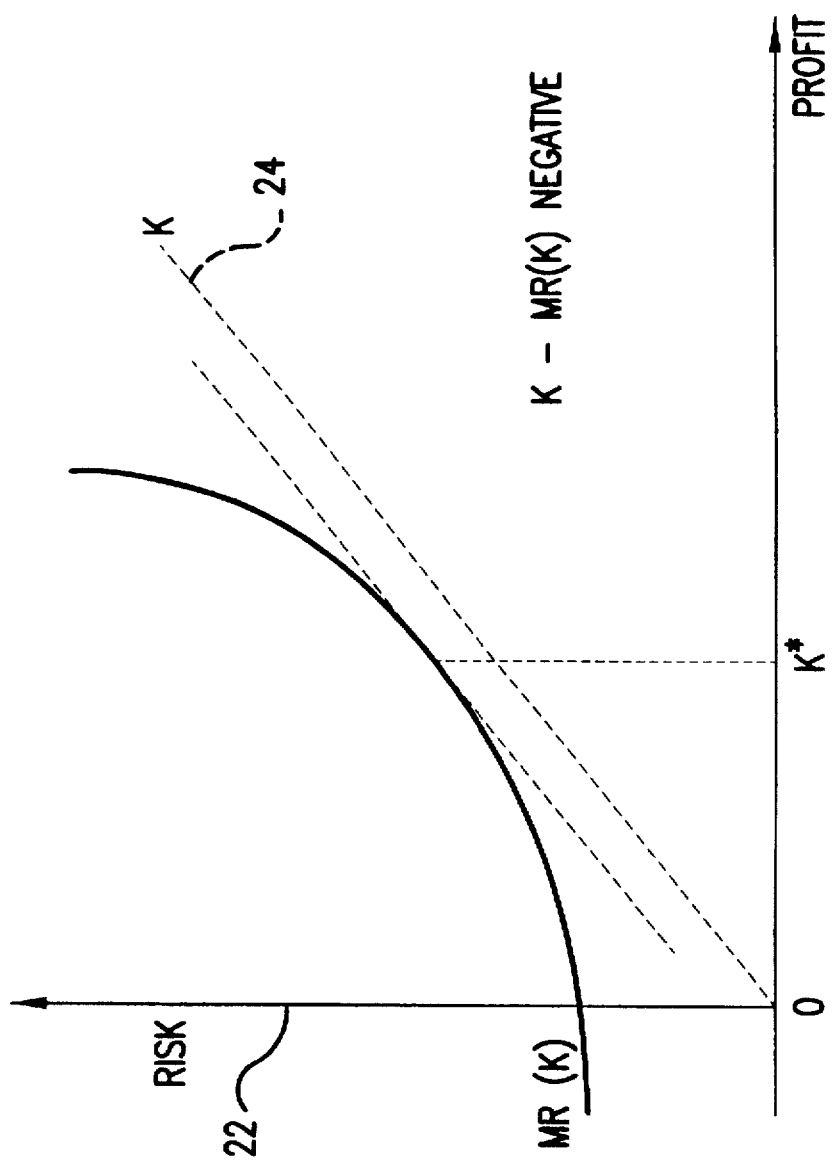

By contrast, the graph of FIG. 5 represents a case where the maximum risk-adjusted profit MR(K) is greater than the expected profit K. Accordingly, the deal would always yield a risk-adjusted loss. A rational portfolio manager would never undertake such a deal.

Figure 6:
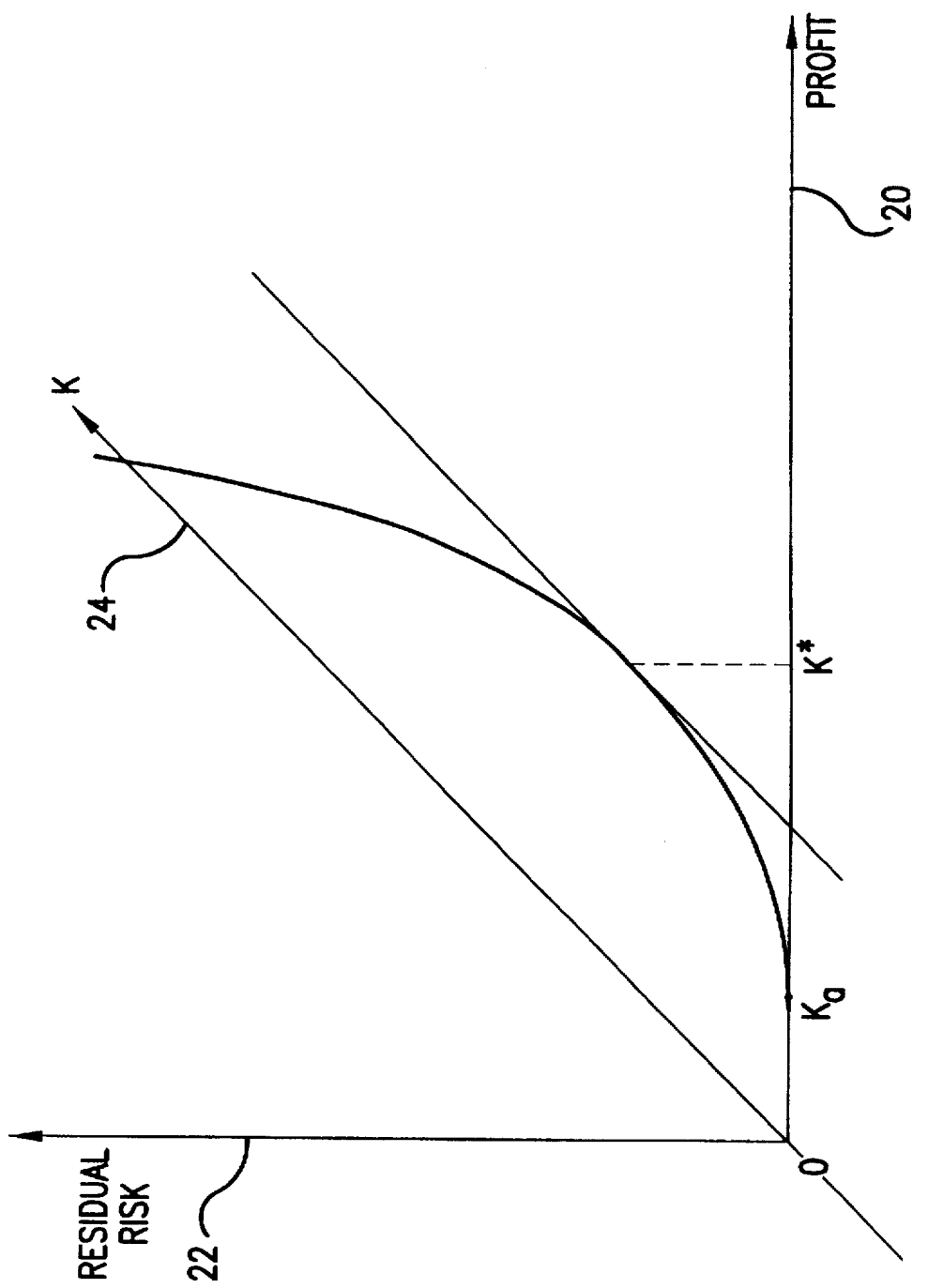

The graph of FIG. 6 represents a market where arbitrage is possible. The market may be complete or incomplete. At point $K_a$, the risk is zero but the profit is greater than zero; thus, riskless arbitrage is possible. Nonetheless, even in this case a portfolio manager may wish to maximize the risk-adjusted profit by seeking a profit $K^*$ which bears some degree of risk (i.e., $MR(K^*)>0$), rather than take the riskless profit of $K_a$.

From the foregoing discussion, it will be apparent that a method and apparatus according to the present invention provides a portfolio manager with a powerful decision-making tool. Using the present invention, it is now possible for a portfolio manager to analyze the cost of a hedge in relation to a range of expected profits and risks.

Figure 7:
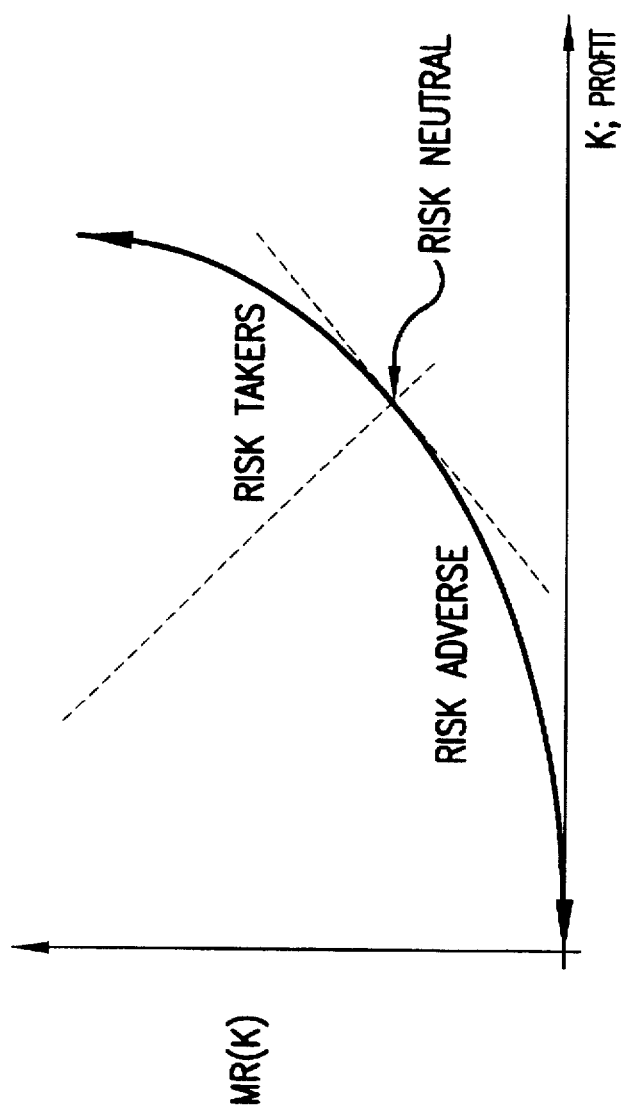
FIG. 7 is a graphical summary of the risk/reward relationship.

FIG. 7 summarizes the relationship between risk and reward, and how this relationship relates to different types of investors. In the graph of FIG. 7, the vertical axis represents minimum regret (i.e., the cost of risk) and the horizontal axis represents the expected profit. Thus, the parabolic curve represents the cost of risk associated with a given profit that can be taken from the transaction. The point on the curve where a tangent line has a slope equal to one is the risk-neutral point, or the point where the marginal cost of risk equals marginal reward. In other words, a single unit of risk yields a single unit of reward. Given this relationship, investors who are risk-averse will opt for a degree of risk somewhere to the left of a line drawn perpendicular to the tangent, where the marginal cost of risk is less than the marginal gain in profit. That is, a single unit of risk yields more than a single unit of reward. Conversely, investors who are risk takers will opt for a degree of risk to the right of the perpendicular, where a single unit of risk yields less than a single unit of reward. An important feature of the present invention is the ability to map a relationship of the type shown in FIG. 7, thereby enabling a portfolio manager to make reasoned decisions on the desirability of undertaking a certain degree of risk.

Figure 8:
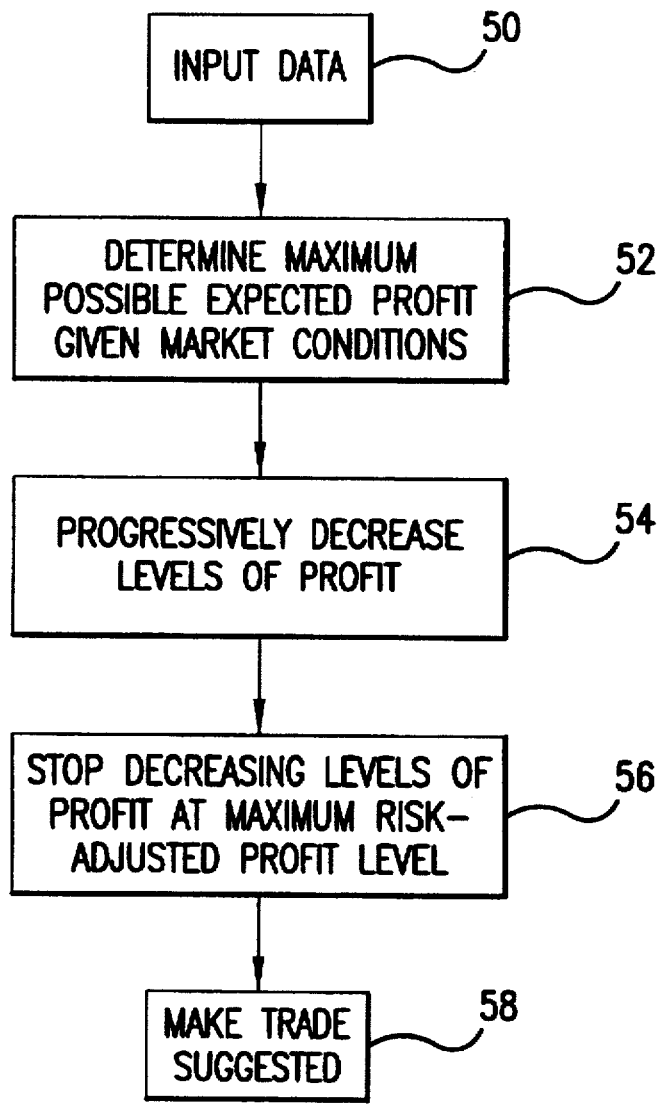
FIG. 8 is a flow chart illustrating an embodiment of a method which may be used to generate buy/sell recommendations designed to maximize risk-adjusted profit for a given portfolio.

FIG. 8 illustrates in flow chart form an exemplary method by which a portfolio manager may use the present invention to create a replicating portfolio using a computer-based system. In step 50, the portfolio manager would first supply the system with certain required input information. In this embodiment, the input information includes the composition and attributes of a target portfolio, market parameters, the instruments available for use in constructing a replicating portfolio, and any current holdings. In step 52, the system uses the input information to determine the maximum possible expected profit under the given market conditions according to equation (8) above. This step includes determining the largest expected profit K for which equation (8) is feasible. Risk is not yet taken into account. Next, in step 54, the system analyzes the risk-adjusted profit using equation (9) for decreasing levels of profit. This process stops at step 56 when a maximum risk-adjusted profit is determined; that is, the value of K that maximizes the difference between expected profit and the cost of risk (K−MR(K)). In this manner, the entire risk/reward curve may be generated.

Finally, in step 58, the system uses the previously-supplied information about available replicating instruments to generate a set of suggested trades that will produce a replicating portfolio designed to ensure the maximized risk-adjusted profit is achieved. Mathematically, the column vector x used to define the cost of risk MR(K) in equation (7) represents the trades that should be made to convert the current portfolio to a new suggested portfolio associated with the maximum risk-adjusted profit.

In yet another practical application, a system configured according to the present invention can be used to determine a risk-reward profile for a portfolio structure according to an investment strategy based on a certain stock index, such as the Standard & Poor (S & P) 500. Using the principles outlined above, the system can determine whether the investor should increase or decrease exposure to this index, or whether the investor is already at an optimal risk-adjusted position. In such an application, details of the portfolio are input to the system and used to calculate an associated measure of the regret function. A potential deal (or series of deals) is then formulated, after which an expected profit from the deal is determined. The system then determines if the risk can be decreased without decreasing the expected profit. Alternatively, the system can determine if there can be an increase in the expected profit without substantially increasing the risk.

In a risk neutral world, every security would have the same rate of return: the riskless rate of interest. Such is clearly not the case in the real world. It is therefore desirable to have some method for computing prices. A state price vector provides this benefit.

A given security can have one of a number of values at some specific future date. Those values can be represented by a matrix d, consisting of elements $d_{ij}$, where $d_{ij}$ represents the value of the security i at the future date upon occurrence of a specific scenario j. The current value of the security can be represented by q, a known quantity. Assume further that one has perfect information, but not perfect foresight; that is, one knows the range of scenarios that could possibly occur, but not the particular scenario which will actually occur. With these assumptions, a state price vector is a set of numbers $\pi_1 \ldots \pi_n$ that discount the future price of the security in a manner consistent with current prices. Stated mathematically:

$$q = \Sigma \pi_1 d_1 + \pi_2 d_2 + \pi_3 d_3 + \ldots + \pi_n d_n \quad \text{(EQ 11)}$$

The state price vector has significant utility in the context of the present invention, with reference to the portfolio replication embodiment. Suppose a new derivative instrument is created. Although its price is not known, similar derivatives may exist in the market. For example, the new derivative (i.e., the target) may be a three-year option on the S & P, where only two-year options exist in the marketplace. In such a situation, the state price vector may be used to compute a fair price for the new instrument.

Using the above example, the present invention can produce a state price vector that will correctly price the two-year options needed to replicate a three-year option over some period less than 2 years. If the state price vector is applied to the three-year option, the present invention will obtain a price that is reasonable, without arbitrage (that is, one could not buy the three-year option and immediately sell its components at a profit). Assume for purposes of this example that one can obtain a zero regret; that is, the three-year option can be perfectly replicated using the two-year options. Since perfect replication is assumed within the two-year period, there will be no risk. Furthermore, for all instruments in the replicating portfolio, one knows the set of numbers P that will give today's price when multiplied by the future possible values. Accordingly, for example, if one sells short the three-year option and buys a portfolio of the two-year options, at the end of the period, regardless of what occurs, the portfolio will have the same total value. Thus, one can buy back the three-year option at the end of the period and sell the replicating portfolio of two-year options and owe nothing. In short, the state price vector is the set of numbers that transform uncertain future prices in a manner that is consistent with today's price. Unfortunately, real-world markets do not contain a large enough number of instruments to permit a perfect replication.

The theory underlying the state price vector feature of the present invention can be explained as follows. A market price vector is a single vector that transforms uncertain prices at the end of a period, in a consistent manner, into prices known with certainty today.

The market price vector is represented by a non-negative vector $\Psi$ in $R^S$ that satisfies the following conditions:

$$D\Psi = q \quad \text{(EQ 12)}$$

$$t^T\Psi = c \quad \text{(EQ 13)},$$

for an arbitrary vector t in $R^S$. Where t is a given, non-arbitrary target vector, a vector satisfying EQ 12 and EQ 13 is referred to as a target price vector.

As before, D represents the future value of the replicating portfolio under all predetermined future scenarios and q represents the price of the replicating portfolio in today's dollars. $\Psi$, then, is the collection of numbers required to collapse the future, uncertain values in D into a price that is consistent with prices in today's market. $\Psi$ may thus be viewed as a weighted average or discounting number.

If the vector $\Psi$ is independent of investor preferences, the market price vector may be used to develop a set of risk-neutral probabilities. Let $\rho$ represent the sum of these vectors $\Psi_1 + \Psi_2 + \ldots + \Psi_S$. Then $\omega = \Psi \rho$ may be viewed as a vector of probabilities (where $\omega$ has positive components that sum to 1). These probabilities are considered risk-neutral because they are independent of investor preferences.

The risk-neutral discounted present value of future payoffs must be equal to today's prices. Accordingly, equations (12) and (13) may be written as:

$$(\rho^{-1})D\omega = q \quad \text{(EQ 14)}$$

$$(\rho^{-1})t^T\omega = c \quad \text{(EQ 15)}$$

Here $\rho^{-1}$ represents a risk-free discount factor for the period and $\omega$ represents the risk-neutral probabilities.

From a practical standpoint, a portfolio manager will wish to determine whether a market or target price vector exists, whether it is unique, and the relationship between the existence of such a vector and arbitrage. The present invention employs duality theory to provide this information.

The one-norm minimum regret model used above to explain the principles of the present invention may be transformed into the following linear programming primal/dual pair.

PRIMAL:

$$MR(K) = \text{Minimize } p^T(y^+, y^-) \quad \text{(EQ 16)}$$

Subject to:

$$-y^+ + y^- + \rho^{-1}D^T x = \rho^{-1}t, (\pi) \quad \text{(EQ 17)}$$

$$p^T(y^- - y^+) - q^T x \geq K - c: (\lambda) \quad \text{(EQ 18)}$$

$$y^+ - y^- \geq 0 \quad \text{(EQ 19)},$$

where p is some vector of scenario probabilities.

DUAL:

$$\text{Maximize } \rho^{-1}t^T\pi + (K-c)\lambda \quad \text{(EQ 20)}$$

Subject to:

$$\rho^{-1}D\pi - \lambda q = 0; (x) \quad \text{(EQ 21)}$$

$$-p \leq \pi - \lambda p \leq p: (y^+, y^-) \quad \text{(EQ 22)}$$

$$\lambda \geq 0 \quad \text{(EQ 23)}.$$

It can be shown that for any finite x (replicating portfolio) and arbitrary, finite t (price of target portfolio), the primal is feasible and bounded for some sufficiently small K (expected profit). Therefore, by duality theory, the dual must also be feasible and bounded.

Under constraint (17) above, the vector $\pi/\lambda$ represents a market or target price vector where $\lambda \geq 1$, since $\pi/\lambda \geq 0$. Since A may be made arbitrarily large by adjusting the expected profit K, there always exists a market/target price vector for an appropriate choice of K.

The dependence of $\pi$ on p (that is, the subjective preferences of market participants) arises in EQ 22. If these constraints are redundant, as they would be if $y^+$, $y^- = 0$ (the zero regret case), then $\pi$ is independent of these preferences. Thus, for $\lambda \geq 1$, $\pi/\lambda$ may be used to derive risk-neutral probabilities for the market, and $\rho^{-1}$ multiplied by the sum of the elements of $\pi/\lambda$ will be the risk-free rate for the market.

Since the constraints of the dual are independent of the target t, the dual may be solved for a number of different targets with only marginally greater computational effort than is required to solve for one target alone. This observation, together with the above discussion, is the basis for using these models for pricing securities.

In most hedging situations, minimizing downside regret is often more useful than minimizing regret itself. A portfolio manager, for example, often only cares about eliminating errors that could hurt a position, not those that could enhance it.

Where only downside errors are to be minimized, the existence of a market or target price vector can be guaranteed by applying a slightly weaker requirement on $\lambda$. This situation may be represented in terms of the model as follows.

PRIMAL:

$$MDR(K) = \text{Minimize } p^T y^- \quad \text{(EQ 24)}$$

Subject to:

$$-y^+ + y^- + \rho^{-1} D^T x = \rho^{-1} r; (\pi) \quad \text{(EQ 25)}$$

$$p^T(y^+ - y^-) - q^T x \geq K - c; (\lambda) \quad \text{(EQ 26)}$$

$$y^+, y^- \geq 0 \quad \text{(EQ 27);}$$

DUAL:

$$\text{Maximize } \rho^{-1} t^T \pi + (K-c)\lambda \quad \text{(EQ 28)}$$

Subject to:

$$r^{-1} D\pi - \lambda q = 0; (x) \quad \text{(EQ 29)}$$

$$\lambda p \leq \pi; (y^+) \quad \text{(EQ 30)}$$

$$\pi - \lambda p \leq p; (y^-) \quad \text{(EQ 31)}$$

$$\lambda \geq 0 \quad \text{(EQ 32).}$$

As shown, $\pi \geq 0$ for all dual feasible solutions (from EQ 30). Since $\pi > 0$ if $\lambda > 0$, $\pi/\lambda$ represents a market price vector for all dual feasible solutions with $\lambda > 0$ (assume that $p > 0$).

Minimizing only downside regret may be particularly advantageous for hedging purposes. According to the above constraints, EQ 30 is active if $y^+ > 0$. Thus, in such a case, $\pi$ is dependent on the subjective preferences of investors (i.e., $\pi = \lambda p$). The influence of investor preferences is acceptable when hedging, since hedging is the purchase of insurance based on a subjective assessment of the future. However, the ability to generate risk-neutral probabilities that are independent of investor preferences is most useful for pricing securities, and that can only be guaranteed when a minimum regret formulation yields a perfect replication with zero regret. By the above formulation, as soon as there is any regret, either upside or downside (i.e., $y^+ > 0$ or $y^- > 0$), $\pi$ will depend on investor preferences (p). In such cases, risk-neutral valuation is not possible. However, an analogous extension is provided by "benchmark-neutral pricing." That is, the original state price vector $\pi$ may be used to price any new instrument relative to a particular target or benchmark chosen.

Benchmark-neutral pricing enables one to determine a fair price for a new instrument under market conditions where perfect replication is impossible. The primal/dual equations above (i.e., EQ 16–23) still hold, since the dual constraints remain feasible and the dual solution remains optimal if the new instrument is priced "correctly." That is, $$\lambda q_{new} = \rho^{-1}(D_{new})^T \pi; (x_{new}) \quad \text{(EQ 46).}$$

The primal also remains optimal with $x_{new} = 0$. In light of the above, it can be seen that benchmark-neutral pricing is equivalent to risk-neutral pricing in complete markets.

The ability to detect mispricing using a market or target price vector represents a powerful feature of the present invention. Consider a situation in which one wishes to examine whether or not a security or portfolio is mispriced in a given market over some given period of time. Assume a set of future scenarios has been determined, and a set of replicating instruments with known, correct prices is available. In terms of the mathematical model, the target is the security or portfolio to be analyzed, with c representing its market price. Thus, the value of the target at the end of the period under each of the scenarios S can be represented by the components of a vector t. Using this information, a system according to the present invention can ascertain whether or not the target security or portfolio is overpriced, underpriced or fairly priced relative to the market.

Pricing analysis using the present invention is based on the observation that a rational way to view whether or not an instrument is mispriced, given the uncertainty of future events, is to examine the maximum expected risk-adjusted profit obtained when attempting to replicate it. Thus, according to the primal/dual relationship at optimality discussed above, we have:

$$MR(K) = \rho^{-1} t^T \pi + (K-c)\lambda \quad \text{(EQ 33).}$$

Solving this equation for the price of the target c gives:

$$c = \rho^{-1} t^T(\pi/\lambda) + K - MR(K)/\lambda \quad \text{(EQ 34).}$$

If the target is fairly priced and there is no arbitrage, then both the expected profit and the maximum risk-adjusted profit will equal zero (that is, $K = MR(K) = 0$) and $\pi/\lambda$ represents a state price vector.

As noted previously, minimum regret MR(K) and minimum downside regret MDR(K) are interchangeable in the primal dual equations depending on the purpose of the analysis. Accordingly, we choose $\lambda^* = 1$ so that the expected risk-adjusted profit (i.e., $K^* - MDR(K^*)$) is maximized, and the price of the target may be represented as:

$$c = \rho^{-1} t^T \pi + \{K^* - MDR(K^*)\} \quad \text{(EQ 35).}$$

Here, the difference $K^* - MDR(K^*)$ indicates the accuracy of the price of the target. A difference that is positive, zero or negative respectively indicates the target is overpriced, fairly priced or underpriced. Thus, by straight-forward application of the principles of the present invention, a portfolio manager can make decisions concerning the price of market instruments on a more-informed basis than was previously possible.

Mispricing is possible even in a complete market (although such mispricing could not persist for long periods without the market arbitraging it away). The present invention enables determination of a true equilibrium price for an instrument even in an incomplete market.

In a complete market, there exists a zero regret primal optimal solution which satisfies the condition:

$$y^+, y^- = 0; \ D^T x = t \quad \text{(EQ 36)}$$

With such a constraint, the primal reduces to:

$$MR(0) = \text{Minimize } 0 \quad \text{(EQ 37)}$$

Subject to:

$$\rho^{-1} D^T x = \rho^{-1} t; \ (\pi) \quad \text{(EQ 38)}$$

$$-q^T x \geq K - c; \ (\lambda) \quad \text{(EQ 39)}$$

The dual therefore reduces to:

$$\text{Maximize } \rho^{-1} t^T \pi + (K-c)\lambda \quad \text{(EQ 40)}$$

Subject to:

$$\rho^{-1} D\pi - \lambda q = 0; \ (x) \quad \text{(EQ 41)}$$

$$\lambda \geq 0 \quad \text{(EQ 42)}$$

A no-arbitrage situation is represented by the special case in which $K=0$; $\lambda > 0$. Note that $\lambda$ is strictly positive since the no-arbitrage condition implies that for $K>0$ regret can no longer be zero. Since the reduced primal and dual must have equal values at the optimum, it follows that:

$$\rho^{-1} t^T \pi + (K-c)\lambda = 0 \quad \text{(EQ 43)}$$

Since $\lambda$ is positive when EQ 41 is active at the optimum, EQ 43 becomes:

$$\rho^{-1} t^T (\pi/\lambda) = c - K \quad \text{(EQ 44)}$$

Here, if $\pi > 0$ (which is guaranteed when minimum downside regret MDR is used), $\pi/\lambda$ is a state price vector provided that the price of the target was adjusted to $c-K$. Thus, for zero regret portfolios, the expected profit $K$ may be interpreted as the degree of mispricing in the market. As before, where $K>0$, the target is overpriced; where $K=0$, the target is fairly priced; and where $K<0$, the target is underpriced.

Price analysis according to the present invention conforms with logic and market observation. By definition, mispricing in a complete market can only occur in the presence of arbitrage. When there is no arbitrage, $K=0$ for $\lambda > 0$, thus:

$$\rho^{-1} t^T (\pi/\lambda) = c \quad \text{(EQ 45)}$$

which indicates that the target's price must be a fair one and that $\pi/\lambda$ is a target price vector. Accordingly, if investors are assumed to function according to a minimum downside regret criterion, a market or target price vector will exist if and only if there is no arbitrage.

The state price vector represents an advantageous extension of the practical utility of the present invention. For example, a portfolio manager may perform a replication to identify a set of transactions which will result in an optimal risk-adjusted portfolio. Applying the duality principles discussed above, the portfolio manager may then determine a state price vector which can be used to indicate whether the instruments comprising this optimal portfolio are fairly priced. It will be readily apparent to persons skilled in the art that the present invention thus enables a portfolio manager to guard against losses with a degree of accuracy and predictability not previously possible.

In summary, given a set of financial instruments, their prices today, and their prices under all scenarios at some horizon date, a system configured according to the present invention enables a user such as a portfolio manager to compute a minimum regret portfolio (that is, one in which the cost of risk is minimized) and a corresponding state price vector. If minimum regret is zero, the state price vector produces a set of risk-neutral probabilities which may be used to compute a risk-neutral price for an arbitrary new security. If minimum regret is not zero, there is no risk-neutral price; however, a benchmark-neutral price may be computed. The approach of the present invention is constructive in that it not only produces a price, but it also produces a replicating portfolio that has that price. Such a replicating portfolio may advantageously be used as a hedge.

While the present invention has been described with reference to specific embodiments, persons skilled in the art will recognize that many modifications and variations are possible. Accordingly, the present invention is intended to cover all such modifications and variations that fall within the spirit and scope of the appended claims.

What is claimed:

1. A computer-based method for constructing an optimal replicating portfolio for a given target portfolio of market instruments, the method comprising the steps of:

(a) generating an electronic representation of the collection of market instruments;

(b) generating an electronic representation of a set of available market instruments from which the replicating portfolio may be constructed;

(c) defining a set of future scenarios, wherein each member of the set of future scenarios associates a future value with a market parameter;

(d) defining a horizon date and a minimum required profit to be obtained on the horizon date from a replicating portfolio for the given target portfolio;

(e) calculating a trade-off between risk and expected profit for an arbitrary replicating portfolio;

(f) calculating a maximum risk-adjusted profit using the set of future scenarios and the trade-off between risk and expected profit, wherein the maximum risk-adjusted profit corresponds to a marginal cost of risk that is equivalent to a marginal benefit to be obtained from assuming that risk;

(g) generating an electronic representation of a replicating portfolio for the given target portfolio that will achieve the maximum risk-adjusted profit, wherein the replicating portfolio comprises market instruments selected from the set of available market instruments; and (h) identifying a set of transactions required to construct the replicating portfolio.

2. The method according to claim 1, further comprising the step of computing a risk premium caused by an inability to construct a replicating portfolio that is a perfect replication of the target portfolio.

3. The method according to claim 1, further comprising the step of computing a price for the replicating portfolio by discounting a future price of the replicating portfolio according to a current price of a known market instrument.

4. The method according to claim 3, wherein said step of computing a price for the replicating portfolio further comprises calculating a state price vector and applying the state price vector to the future price of the replicating portfolio.

5. The method according to claim 1, further comprising the step of executing the set of transactions to construct the replicating portfolio.

6. A computer-based apparatus for constructing an optimal replicating portfolio for a given target portfolio of market instruments, the apparatus comprising:

(a) an input module programmed to accept information including an electronic representation of the target portfolio, a set of future scenarios, an electronic representation of a set of available market instruments, and a minimum profit to be achieved;

(b) an optimization module programmed to calculate an optimal replicating portfolio associated with the target portfolio, the set of future scenarios, and the minimum profit to be achieved, wherein the optimal replicating portfolio comprises an electronic representation of a set of market instruments for which a marginal cost of risk is equivalent to a marginal profit to be obtained from assuming that risk;

(c) a portfolio replication module programmed to identify a set of transactions that will construct the optimal replicating portfolio from a subset of the set of available market instruments; and (d) an output module programmed to provide a user of said apparatus with information relating to the optimal replicating portfolio.

7. The apparatus of claim 6, further comprising a price calculator programmed to compute a current price for a financial instrument consistent with a current price of a known market portfolio.

8. The apparatus of claim 7, wherein said price calculator computes a state price vector for discounting the future price of the financial instrument.

9. The apparatus of claim 6, wherein said optimization module is further programmed to calculate a trade-off between the minimum profit to be achieved and a degree of risk required to achieve that minimum profit.

10. The apparatus of claim 6, wherein said input module comprises a real-time data feed.

11. A computer-based apparatus for constructing an optimal replicating portfolio for a given target portfolio of market instruments, the apparatus comprising:

a memory;

an input device for receiving input, said input device including means for generating an electronic representation of a target portfolio, means for generating an electronic representation of a set of available market instruments from which the replicating portfolio may be constructed, means for defining a set of future scenarios, wherein each member of the set associates a future value with a market parameter, and means for defining a horizon date and a minimum required profit attainable from the replicating portfolio at the horizon date; and a processor coupled to the input device and the memory, said processor including means for determining a trade-off between risk and expected profit for an arbitrary replicating portfolio, means for determining a maximum risk-adjusted profit using the set of future scenarios and the trade-off between risk and expected profit, wherein the maximum risk-adjusted profit corresponds to a marginal cost of risk that is equivalent to a marginal benefit to be obtained from assuming that risk, means for generating an electronic representation of a replicating portfolio for the target portfolio that will achieve the maximum risk-adjusted profit, wherein the replicating portfolio comprises market instruments from the set of available market instruments, and means for identifying a set of transactions required to construct the replicating portfolio.

12. A method for determining whether a given market instrument is fairly priced, the method comprising the steps of:

(a) generating an electronic representation of the given market instrument;

(b) generating an optimal replicating portfolio for the given market instrument, wherein the optimal replicating portfolio represents a maximum risk-adjusted profit under a predetermined set of future scenarios, the maximum risk-adjusted profit corresponding to a marginal cost of risk that is equivalent to a marginal benefit to be obtained by assuming that risk, the optimal replicating portfolio comprising an electronic representation of one or more predetermined market instruments;

(c) determining a value corresponding to the maximum risk-adjusted profit associated with the replicating portfolio; and (d) indicating whether the given market instrument is fairly priced based on the value of the maximum risk-adjusted profit, wherein the given market instrument is deemed to be overpriced when the value is positive, fairly priced when the value is zero, and underpriced when the value is negative.

* * * * *

UNITED STATES PATENT AND TRADEMARK OFFICE
CERTIFICATE OF CORRECTION

| | | |
|---|---|---|
| PATENT NO. | : 5,799,287 | Page 1 of 1 |
| APPLICATION NO. | : 08/866303 | |
| DATED | : August 25, 1998 | |
| INVENTOR(S) | : Dembo | |

It is certified that error appears in the above-identified patent and that said Letters Patent is hereby corrected as shown below:

On the Title Page, Item (54) and in the Specification, Column 1, title, replace "METHOD AND APPARATUS FOR OPTIMAL PORTFOLIO REPLICATION" with -- OPTIMAL PORTFOLIO REPLICATION --, and In the Specification
Column 11, line 41, replace "constraint (8)" with -- constraint (26) --.

Signed and Sealed this
Eleventh Day of February, 2014

Michelle K. Lee
*Deputy Director of the United States Patent and Trademark Office*